United States Patent Office 2,832,141
Patented Apr. 29, 1958

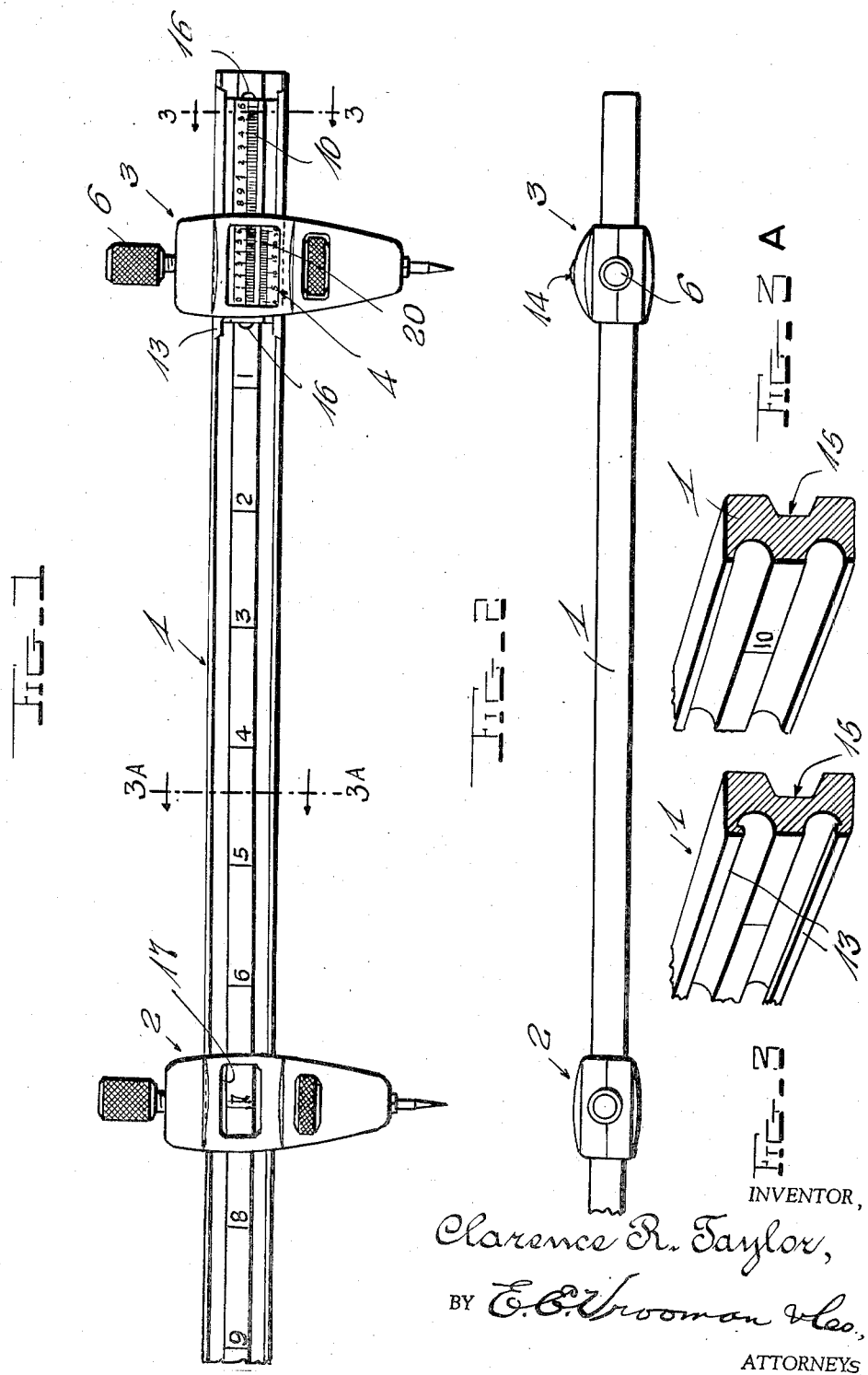

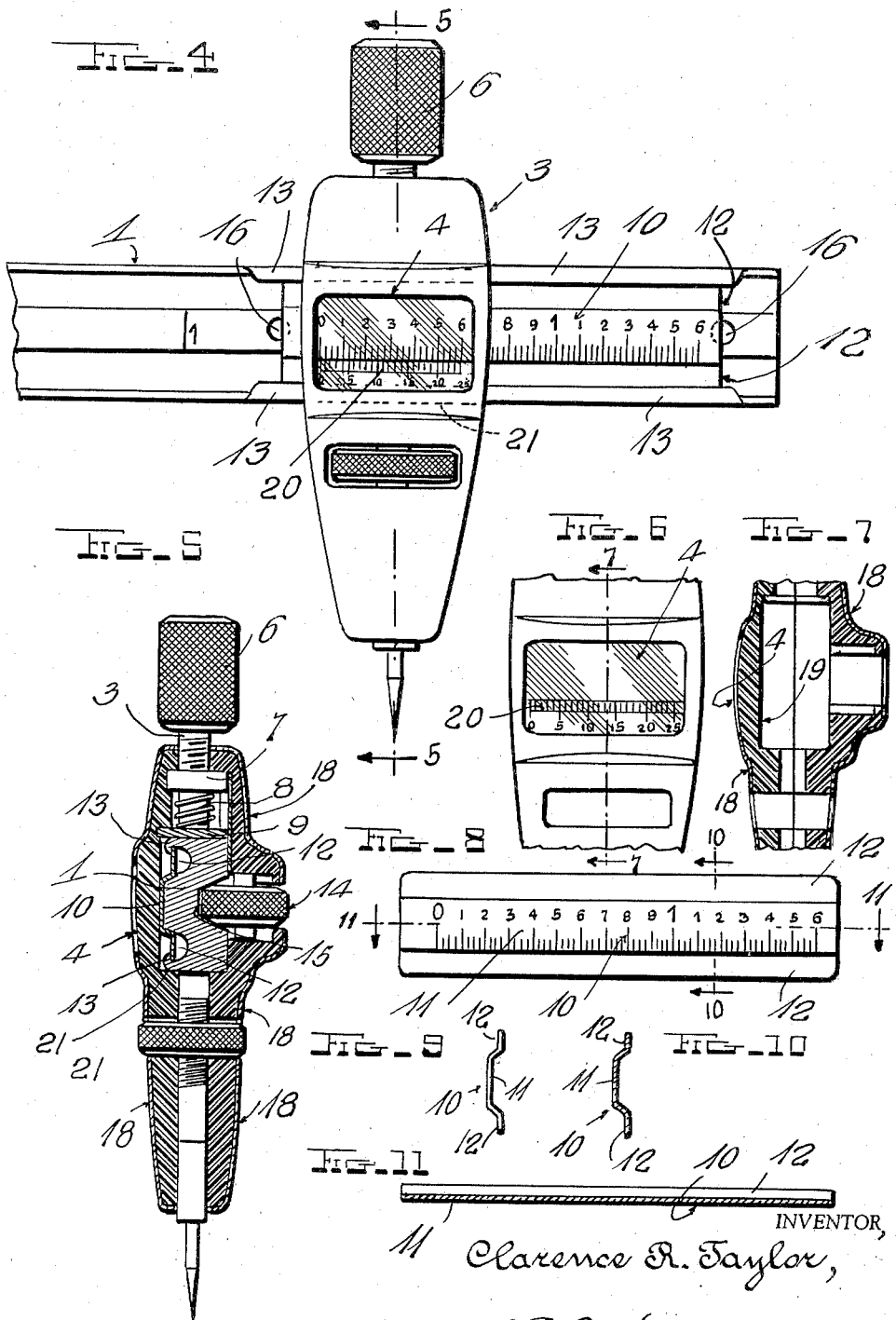

2,832,141

CALIPER-BEAM COMPASS

Clarence R. Taylor, Penfield, N. Y.

Application November 5, 1956, Serial No. 620,375

1 Claim. (Cl. 33—27)

This invention relates to a caliper-beam compass.

An object of this invention is to produce a device that can be used for making radii direct without the use of a ruler, and also can be used to read off distances from a drawing or print.

Another object of this invention is to provide an instrument with a vernier so that settings can be made to $\frac{1}{1000}$ inch for both laying out circles and reading back dimensions.

A further object of this invention is to provide means whereby, with the addition of a slidable scale segment, the instrument may be calibrated. This calibration corrects for normal production tolerances and permits the instrument to be set accurately for making measurements as fine as $\frac{1}{1000}$ inch.

A still further object of the invention is to provide means whereby a beam compass may be used directly to lay out radii or measure distances from zero inches to any length desired in steps of $\frac{1}{1000}$ inch.

This application discloses certain novel elements not shown in my Patent No. 2,627,662, issued February 10, 1953.

With the foregoing and other objects in view, this invention comprises certain novel constructions, combinations, and arrangements of parts as will be hereinafter fully described, illustrated in the accompanying drawings, and more particularly pointed out in the appended claim.

In the drawings:

Figure 1 is a view in side elevation of a caliper-beam compass constructed in accordance with the present invention, while Figure 2 is a plan view of the same.

Figure 3 is an enlarged fragmentary sectional view of the beam taken on line 3—3 of Figure 1, and looking in the direction of the arrows.

Figure 3A is another fragmentary sectional view of the beam, taken on line 3A—3A of Figure 1, and looking in the direction of the arrows.

Figure 4 is an enlarged sectional view of the beam with one of the coursers shown thereon in front elevation.

Figure 5 is a vertical sectional view on line 5—5, Figure 4, and looking in the direction of the arrows.

Figure 6 is a fragmentary view of the courser and shows the vernier scale which is stamped thereon.

Figure 7 is a vertical sectional view taken on line 7—7, Figure 6, and looking in the direction of the arrows.

Figure 8 is a view in elevation of the slidable scale of this device.

Figure 9 is an end view of the slidable scale.

Figure 10 is a vertical sectional view taken on line 10—10, Figure 8, and looking in the direction of the arrows.

Figure 11 is a horizontal sectional view taken on line 11—11, Figure 8, and looking in the direction of the arrows.

Referring to the drawings by numerals, 1 designates the beam on which are slidably mounted the two coursers 2 and 3. Courser 2 has a transparent section or window 17, and courser 3 has a transparent section or window 4. Vernier scale 20 is stamped on the inside surface 19 of courser 3 which is visible through transparent plastic window 4, Fig. 7. Single line mark on inside surface of courser 2 is similarly viewed through transparent window 17. Extending into the top of the courser 3 is a clamping screw 6 (Fig. 5) which turns in and is held by nut 7. On the screw 6, under nut 7 is a coil spring 8, which spring presses against the pad 9. The pad 9 rests on the top edge of beam 1. A sliding scale 10 comprising an outwardly bulged flat body 11 and top and bottom flanges 12 is located in the beam 1 and retained therein by flanges 13. These flanges 13 extend inwardly as shown in Figures 3, 4, and 5. While the flanges 13 retain the sliding scale 10 in an assembled position with the beam 1, they permit of sliding movement of said scale upon the beam, as the operator desires. Scale 10 fits under flanges 13 on beam 1 with a spring action so that it fits tightly and still can be moved longitudinally.

A roll or wheel 14 is retained by courser 3 and normally is positioned in the channel 15 of beam 1. The beam 1 is provided with two holes or apertures 16 between which the sliding scale 10 is normally positioned. A pin may be inserted in either of these holes 16 and levered against the end of the scale to easily adjust it longitudinally of the beam 1. This scale 10 permits calibrating the instrument. For this type of instrument it is essential that the scale be calibrated, not only because of production tolerances, but also because a variety of leads and steel points might be used. The user first sets in and clamps the points, whether they be two metal points or one metal point and a sharpened lead. He then adjusts the coursers to read, say, 3 inches on any standard ruler and locks them in place. Courser 2 is locked in place with the indicator line or mark, which shows through window 17, directly over the graduated mark for 3 inches on beam 1. He then slides movable scale 10 until it corresponds to zero reading on the vernier, or in other words, to a length of three inches. The instrument is now calibrated and is ready for use for any dimension required. It is important to appreciate that the courser with the vernier scale is held in place snugly by the spring loaded pad 9, Fig. 5, which permits it to be easily adjusted by means of the wheel 14, the wheel being on the opposite side to the scale 10, Fig. 5.

In production, both coursers 2 and 3 are made of transparent plastic. Windows 17 and 4 are obtained then by masking these areas off and painting over the rest of the plastic by a surface coat of opaque paint 18, Figs. 5 and 7.

It is to be understood that the scale I have referred to is made up of three components: One, scale marking on the beam proper (Fig. 1), second, scale markings on slidable scale unit 10, and third, vernier scale marking on the inside surface of the plastic courser, plastic courser 2 having only a single line mark. These marks or scale impressions are made on the inside surface of both plastic coursers as at 19, Fig. 7.

From the foregoing it is to be understood that I have provided a beam compass with a built-in scale for setting to any dimension. This scale includes three elements-markings on the beam proper, markings on slidable scale unit and vernier scale markings on plastic courser. The vernier scale permits settings to be made to $\frac{1}{1000}$ inch for both laying out circles and reading back dimensions. By combination of the scale 10 and vernier 20 any one inch length can be divided into thousandths. This is all made possible by the design of both coursers 2 and 3 which have long flat bearing surface 21 against the bottom face of beam 1 shown in Figures 4 and 5.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

A vernier beam compass, comprising a beam having a pair of longitudinal channels on the front face thereof and indicia along the space between said channels, and a rear channel, a pair of coursers mounted on said beam, each courser comprising a body having a transverse channel therethrough, through which extends said beam, each courser having a slot in the rear thereof, a vernier wheel mounted in each slot and engaging in said rear channel whereby rotation of said vernier wheel moves a courser along said beam, a transparent window in one of said coursers, indicia carried by one of said coursers viewable through said window, and a scale bearing further indicia mounted on said beam and viewable through said transparent window, said beam having upstanding flanges along a portion of its length, said scale being centrally outwardly bulged longitudinally and having upwardly and downwardly extending flanges engaging under said first-mentioned flanges in said front channels to permit limited longitudinal sliding movement of said scale on said beam, said scale being comprised of resilient material whereby frictional engagement of said second and said first-mentioned flanges holds said scale in longitudinally selected position.

References Cited in the file of this patent

UNITED STATES PATENTS

| | | |
|---|---|---|
| 1,404,794 | Reitenbaugh | Jan. 31, 1922 |
| 2,176,681 | Paege | Oct. 17, 1939 |
| 2,419,752 | Zumbuhl | July 31, 1944 |
| 2,440,973 | Podolan | Oct. 25, 1944 |
| 2,499,673 | Olejniczak | Mar. 7, 1950 |
| 2,627,662 | Taylor | Feb. 10, 1953 |

FOREIGN PATENTS

| | | |
|---|---|---|
| 384,995 | France | Feb. 22, 1908 |
| 721,368 | France | Dec. 12, 1931 |
| 50,392 | Norway | Nov. 30, 1921 |
| 474,199 | Germany | Mar. 27, 1929 |